US012190152B2

(12) United States Patent
Reid

(10) Patent No.: US 12,190,152 B2
(45) Date of Patent: Jan. 7, 2025

(54) RUN-TIME SCHEDULERS FOR FIELD PROGRAMMABLE GATE ARRAYS OR OTHER LOGIC DEVICES

(71) Applicant: Raytheon Company, Waltham, MA (US)

(72) Inventor: Stephen R. Reid, Ayer, MA (US)

(73) Assignee: Raytheon Company, Tewksbury, MA (US)

( * ) Notice: Subject to any disclaimer, the term of this patent is extended or adjusted under 35 U.S.C. 154(b) by 610 days.

(21) Appl. No.: 17/364,634

(22) Filed: Jun. 30, 2021

(65) Prior Publication Data
US 2024/0028396 A1 Jan. 25, 2024

Related U.S. Application Data

(60) Provisional application No. 63/117,998, filed on Nov. 24, 2020, provisional application No. 63/117,988, filed on Nov. 24, 2020, provisional application No. 63/117,979, filed on Nov. 24, 2020.

(51) Int. Cl.
*G06F 9/46* (2006.01)
*G06F 9/48* (2006.01)

(52) U.S. Cl.
CPC .................................. *G06F 9/4893* (2013.01)

(58) Field of Classification Search
CPC .................................................. G06F 9/4893
USPC .............................................................. 718/100
See application file for complete search history.

(56) References Cited

U.S. PATENT DOCUMENTS

| | | | |
|---|---|---|---|
| 5,949,799 A * | 9/1999 | Grivna | H04L 1/1664 370/405 |
| 6,625,797 B1 | 9/2003 | Edwards et al. | |
| 7,073,158 B2 * | 7/2006 | McCubbrey | G06F 30/34 716/108 |
| 7,571,216 B1 * | 8/2009 | McRae | G06F 13/28 709/213 |
| 8,869,121 B2 * | 10/2014 | Vorbach | G06F 8/447 717/149 |
| 8,972,958 B1 | 3/2015 | Brewer | |
| 9,223,921 B1 | 12/2015 | Carrillo et al. | |

(Continued)

FOREIGN PATENT DOCUMENTS

WO 2020112999 A1 6/2020

OTHER PUBLICATIONS

"AXI DataMover v5.1—LogiCORE IP Product Guide", Xilinx, Inc., Vivado Design Suite, Apr. 2017, 59 pages.

(Continued)

*Primary Examiner* — Mehran Kamran

(57) ABSTRACT

A method includes obtaining thermal information and latency information associated with multiple components of at least one semiconductor chip. The latency information identifies multiple latencies associated with multiple applications to be executed by the components of the at least one semiconductor chip. The method also includes scheduling, using a run-time scheduler on the at least one semiconductor chip, execution of the multiple applications by the components of the at least one semiconductor chip. The run-time scheduler utilizes the thermal information and the latency information along with run-time events to determine which components of the at least one semiconductor chip execute the applications over time.

20 Claims, 6 Drawing Sheets

(56) References Cited

U.S. PATENT DOCUMENTS

| | | | |
|---|---|---|---|
| 9,652,570 B1* | 5/2017 | Kathail | G06F 30/327 |
| 10,084,725 B2* | 9/2018 | Raponi | H04L 49/251 |
| 10,908,954 B2* | 2/2021 | Steffen | G06F 9/4881 |
| 10,949,585 B1* | 3/2021 | Winefeld | G06F 30/39 |
| 11,048,758 B1 | 6/2021 | Kim et al. | |
| 11,061,835 B1* | 7/2021 | Chen | G06F 3/0611 |
| 2001/0016933 A1 | 8/2001 | Chang et al. | |
| 2002/0156929 A1 | 10/2002 | Hekmatpour | |
| 2012/0167108 A1* | 6/2012 | Bowers | G06F 9/5072 718/103 |
| 2013/0160016 A1* | 6/2013 | Gummaraju | G06F 9/5044 718/102 |
| 2013/0227261 A1* | 8/2013 | Anderson | G06F 1/206 713/2 |
| 2013/0298132 A1* | 11/2013 | Kurihara | G06F 9/4843 718/102 |
| 2014/0096119 A1 | 4/2014 | Vasudevan et al. | |
| 2015/0026495 A1* | 1/2015 | Jain | G06F 1/32 713/323 |
| 2015/0046679 A1* | 2/2015 | Gathala | G06F 9/4552 712/30 |
| 2015/0058832 A1 | 2/2015 | Gonion | |
| 2015/0277791 A1* | 10/2015 | Li | G06F 3/064 711/114 |
| 2015/0286262 A1* | 10/2015 | Park | G06F 11/3058 713/320 |
| 2017/0262567 A1* | 9/2017 | Vassiliev | H03K 19/17736 |
| 2017/0277531 A1* | 9/2017 | McGrath | G06F 11/36 |
| 2017/0289000 A1* | 10/2017 | Park | G06F 11/3058 |
| 2018/0129503 A1* | 5/2018 | Narayan | H03K 19/0175 |
| 2018/0268096 A1* | 9/2018 | Chuang | G06F 30/337 |
| 2018/0278496 A1* | 9/2018 | Kulshreshtha | H04L 43/04 |
| 2019/0042222 A1 | 2/2019 | Rong | |
| 2020/0142735 A1* | 5/2020 | Maciocco | H04L 63/20 |
| 2020/0334122 A1* | 10/2020 | Shepard | G06F 11/3466 |
| 2021/0021484 A1* | 1/2021 | Sood | H04W 12/122 |
| 2021/0056368 A1 | 2/2021 | Nudejima et al. | |
| 2021/0081347 A1 | 3/2021 | Liao et al. | |
| 2021/0124615 A1* | 4/2021 | Klingenbrunn | G06F 9/3004 |
| 2021/0318893 A1* | 10/2021 | Zhang | G06F 3/04842 |
| 2021/0397476 A1* | 12/2021 | Liu | G06F 11/3062 |
| 2022/0066908 A1* | 3/2022 | Kim | G06F 11/3612 |

OTHER PUBLICATIONS

Patel, "FPGA designs with VHDL", PythonDSP, Oct. 2017, 229 pages.
Garrault et al., "HDL Coding Practices to Accelerate Design Performance", Xilinx, Inc., White Paper: Virtex-4, Spartan-3/3L, and Spartan-3E FPGAs, Jan. 2006, 22 pages.
Shi, "Rapid Prototyping of an FPGA-Based Video Processing System", Thesis, Virginia Polytechnic Institute and State University, Apr. 2016, 71 pages.
"FIFO Generator v13.1—LogiCORE IP Product Guide", Xilinx, Inc., Vivado Design Suite, Apr. 2017, 218 pages.
Russell, "Fine Tune Your Embedded FPGA System with Emulation Tools—DornerWorks", Dec. 2017, 10 pages.
Pagani, "Software support for dynamic partial reconfigurable FPGAs on heterogeneous platforms", University of Pisa, School of Engineering, 2015/2016, 98 pages.
Erusalagandi, "Leveraging Data-Mover IPs for Data Movement in Zynq-7000 AP SoC Systems", Xilinx, Inc., White Paper: Zynq-7000 AP SoC, Jan. 2015, 27 pages.
"A Guide to Vectorization with Intel® C++ Compilers", Intel Corp., 2010, 39 pages.
"Migrating Motor Controller C++ Software from a Microcontroller to a PolarFire FPGA with LegUp High-Level Synthesis—LegUp Computing Blog", Microchip Technology Inc., 2015, 16 pages.
Nabi, "Research Article—Automatic Pipelining and Vectorization of Scientific Code for FPGAs", Hindawi, International Journal of Reconfigurable Computing, 2019, 13 pages.
"How To Cross-Compile Clang/LLVM using Clang/LLVM", The LLVM Compiler Infrastructure, Documentation—User Guides, Mar. 2019, 9 pages.
"Vitis Model Composer User Guide", Xilinx, Inc., UG1483 (v2021.1), Jun. 2021, 938 pages.
"Vivado Design Suite User Guide—High-Level Synthesis", Xilinx, Inc., UG902 (v2019.2), Jan. 2020, 589 pages.
Liang et al., "Vectorization and Parallelization of Loops in C/C++ Code", International Conference Frontiers in Education: CS and CE, 2017, 4 pages.
Wang et al., "DeepBurning: Automatic Generation of FPGA-based Learning Accelerators for the Neural Network Family", DAC 16, Jun. 2016, 6 pages.
Jiang et al., "Hardware/Software Co-Exploration of Neural Architectures", IEEE Transactions on Computer-Aided Design of Integrated Circuits and Systems, Jan. 2020, 10 pages.
"AdvMag Optimization", RIST FX10 and Nagoya University FX100, Jul. 2018, 12 pages.
Crain, "Cray Fortran 90 Optimization", CUG 1996 Fall Proceedings, Cray Research, A Silicon Graphics Company, 1996, 2 pages.
Lantz, "Vector Parallelism on Multi-Core Processors", Cornell University, Jul. 2019, 83 pages.
Ren et al., "Exploiting Vector and Multicore Parallelism for Recursive, Data- and Task-Parallel Programs", Association for Computing Machinery, Feb. 2017, 14 pages.
Yanez et al., "Simultaneous multiprocessing in a software-defined heterogeneous FPGA", Journal of Supercomputing, Apr. 2018, 18 pages.
Niu et al., "Reconfiguring Distributed Applications in FPGA Accelerated Cluster With Wireless Networking", 2011 International Conference on Field Programmable Logic and Applications (FPL), Oct. 2011, 6 pages.
Jones et al., "Dynamically Optimizing FPGA Applications by Monitoring Temperature and Workloads", VLSID 07: Proceedings of the 20th International Conference on VLSI Design, Jan. 2007, 8 pages.
Iturbe et al., "Research Article—Runtime Scheduling, Allocation, and Execution of Real-Time Hardware Tasks onto Xilinx FPGAs Subject to Fault Occurrence", International Journal of Reconfigurable Computing, 2013, 33 pages.
Ramezani, "A Prefetch-aware Scheduling for FPGA-based Multi-Task Graph Systems", Journal of Supercomputing, Jan. 2020, 12 pages.
Jing et al., Abstract of "Energy-efficient scheduling on multi-FPGA reconfigurable systems", Microprocessors and Microsystems, Aug.-Oct. 2013, 4 pages.
Perng et al., "Energy-Efficient Scheduling on Multi-Context FPGA's", 2006 IEEE International Symposium on Circuits and Systems, May 2006, 4 pages.
Chatarasi et al., "Vyasa: A High-Performance Vectorizing Compiler for Tensor Convolutions on the Xilinx AI Engine", 2020 IEEE High Performance Extreme Computing Conference (HPEC), Sep. 2020, 12 pages.
International Search Report and Written Opinion of the International Searching Authority in connection with International Patent Application No. PCT/US2021/059009 issued Feb. 4, 2022, 16 pages.
International Search Report and Written Opinion of the International Searching Authority in connection with International Patent Application No. PCT/US2021 /059018 issued Feb. 10, 2022, 15 pages.
International Search Report and Written Opinion of the International Searching Authority in connection with International Patent Application No. PCT/US2021/059013 issued Feb. 11, 2022, 13 pages.
Sharma et al., "Run-Time Mitigation of Power Budget Variations and Hardware Faults by Structural Adaptation of FPGA-Based Multi-Modal SoPC", Computers 2018, vol. 7, No. 4, Oct. 2018, 34 pages.
Eckert et al., "Operating System Concepts for Reconfigurable Computing: Review and Survey", International Journal of Reconfigurable Computing, vol. 2016, Nov. 2016, 12 pages.

(56) References Cited

OTHER PUBLICATIONS

Sousa et al., "Runtime Adaptation of Application Execution under Thermal and Power Constraints in Massively Parallel Processor Arrays", Proceedings of the 18th International Workshop on Software and Compilers for Embedded Systems, Jun. 2015, 4 pages.

Pellizzoni et al., "Real-Time Management of Hardware and Software Tasks for FPGA-Based Embedded Systems", IEEE Transactions on Computers, vol. 56, No. 12, Dec. 2007, 15 pages.

Kida et al., "A High Level Synthesis Approach for Application Specific DMA Controllers", 2019 International Conference on Reconfigurable Computing and FPGAs (Reconfig), IEEE, Dec. 2019, 2 pages.

Lo et al., "Model-Based Optimization of High Level Synthesis Directives", 26th International Conference on Field Programmable Logic and Applications (FPL), EPFL, Aug. 2016, 10 pages.

Ferretti et al., "Lattice-Traversing Design Space Exploration for High Level Synthesis", IEEE 36th International Conference on Computer Design (ICCD), Oct. 2018, 8 pages.

Singh et al., "Parallelizing High-Level Synthesis: A Code Transformational Approach to High-Level Synthesis", EDA for IC System Design, Verification, and Testing, Mar. 2006, 20 pages.

Non-Final Office Action dated Jul. 11, 2022 in connection with U.S. Appl. No. 17/364,565, 11 pages.

Non-Final Office Action dated Dec. 19, 2023 in connection with U.S. Appl. No. 17/364,565, 17 pages.

Final Office Action dated Oct. 4, 2023 in connection with U.S. Appl. No. 17/364,565, 12 pages.

Non-Final Office Action dated Apr. 26, 2023 in connection with U.S. Appl. No. 17/364,565, 10 pages.

Hu et al., "Semi-automatic Hardware Design using Ontologies," ICARCV 2004, 8th Control, Automation, Robotics and Vision Conference, 2004, 6 pages.

Office Action dated Jul. 5, 2024 in connection with U.S. Appl. No. 17/364,481, 12 pages.

Office Action dated Apr. 25, 2024 in connection with U.S. Appl. No. 17/364,565, 22 pages.

Office Action dated Apr. 15, 2024 in connection with U.S. Appl. No. 17/364,481, 13 pages.

Office Action dated Feb. 2, 2024 in connection with U.S. Appl. No. 17/364,481, 11 pages.

Office Action dated Nov. 28, 2024 in connection with European Patent Application No. 21823421.9, 14 pages.

\* cited by examiner

RUN-TIME SCHEDULERS FOR FIELD PROGRAMMABLE GATE ARRAYS OR OTHER LOGIC DEVICES

CROSS-REFERENCE TO RELATED APPLICATIONS AND PRIORITY CLAIM

This application claims priority under 35 U.S.C. § 119 (e) to U.S. Provisional Patent Application Nos. 63/117,979; 63/117,988; and 63/117,998 filed on Nov. 24, 2020, all of which are hereby incorporated by reference in their entirety.

This application is related to the following U.S. non-provisional patent applications being filed concurrently herewith:
- U.S. Non-Provisional patent application Ser. No. 17/364,481 filed on Jun. 30, 2021 and entitled "AUTOMATED DESIGN OF BEHAVIORAL-BASED DATA MOVERS FOR FIELD PROGRAMMABLE GATE ARRAYS OR OTHER LOGIC DEVICES"; and
- U.S. Non-Provisional patent application Ser. No. 17/364,565 filed on Jun. 30, 2021 and entitled "AUTOMATED DESIGN OF FIELD PROGRAMMABLE GATE ARRAY OR OTHER LOGIC DEVICE BASED ON ARTIFICIAL INTELLIGENCE AND VECTORIZATION OF BEHAVIORAL SOURCE CODE".

Both of these non-provisional applications are hereby incorporated by reference in their entirety.

GOVERNMENT RIGHTS

This invention was made with government support under contract number FA8650-19-C-7975 awarded by the United States Air Force. The government has certain rights in the invention.

TECHNICAL FIELD

This disclosure relates generally to the design of field programmable gate arrays (FPGAs) and other logic devices. More specifically, this disclosure relates to run-time schedulers for field programmable gate arrays or other logic devices.

BACKGROUND

The design of a logic device, such as a field programmable gate array (FPGA), has a direct impact on how effectively the logic device can operate. For example, the scheduling of applications, instructions, or other logic executed by engines, cores, or other components of a logic device can affect whether the applications, instructions, or other logic is executed in the fastest possible manner or within required time periods. If a scheduler is poorly designed, the engines, cores, or other components of a logic device may have periods where applications, instructions, or other logic is not being executed due to scheduling delays. This reduces throughput or otherwise negatively impacts the performance of the logic device.

SUMMARY

This disclosure provides run-time schedulers for field programmable gate arrays or other logic devices.

In a first embodiment, a method includes obtaining thermal information and latency information associated with multiple components of at least one semiconductor chip. The latency information identifies multiple latencies associated with multiple applications to be executed by the components of the at least one semiconductor chip. The method also includes scheduling, using a run-time scheduler on the at least one semiconductor chip, execution of the multiple applications by the components of the at least one semiconductor chip. The run-time scheduler utilizes the thermal information and the latency information along with run-time events to determine which components of the at least one semiconductor chip execute the applications over time.

In a second embodiment, an apparatus includes at least one semiconductor chip and a run-time scheduler. The run-time scheduler is configured to obtain thermal information and latency information associated with multiple components of the at least one semiconductor chip. The latency information identifies multiple latencies associated with multiple applications to be executed by the components of the at least one semiconductor chip. The run-time scheduler is also configured to schedule execution of the multiple applications by the components of the at least one semiconductor chip. The run-time scheduler is configured to utilize the thermal information and the latency information along with run-time events to determine which components of the at least one semiconductor chip execute the applications over time.

In a third embodiment, a non-transitory computer readable medium contains instructions that when executed cause at least one run-time scheduler of at least one semiconductor chip to obtain thermal information and latency information associated with multiple components of the at least one semiconductor chip. The latency information identifies multiple latencies associated with multiple applications to be executed by the components of the at least one semiconductor chip. The instructions when executed also cause the at least one run-time scheduler to schedule execution of the multiple applications by the components of the at least one semiconductor chip. The instructions when executed cause the run-time scheduler to utilize the thermal information and the latency information along with run-time events to determine which components of the at least one semiconductor chip execute the applications over time.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
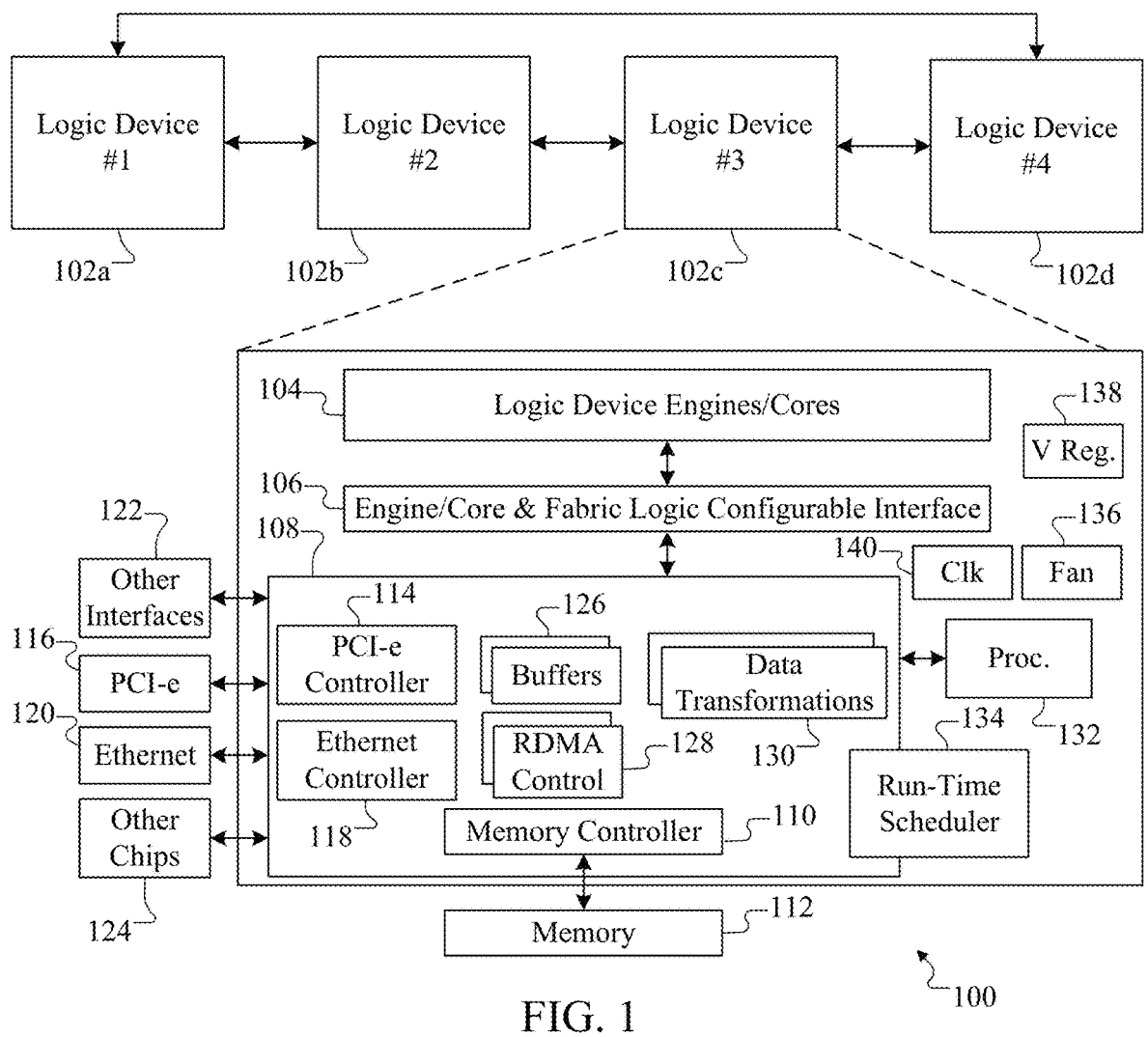
FIG. 1 illustrates an example system containing logic devices having run-time schedulers according to this disclosure.

FIGS. 1 through 7, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, the design of a logic device, such as a field programmable gate array (FPGA), has a direct impact on how effectively the logic device can operate. For example, the scheduling of applications, instructions, or other logic executed by engines, cores, or other components of a logic device can affect whether the applications, instructions, or other logic is executed in the fastest possible manner or within required time periods. If a scheduler is poorly designed, the engines, cores, or other components of a logic device may have periods where applications, instructions, or other logic is not being executed due to scheduling delays. This reduces throughput or otherwise negatively impacts the performance of the logic device.

This disclosure describes various systems, methods, and techniques to support run-time scheduling for use with one or more FPGAs or other logic devices. As described in more detail below, a run-time scheduler can be designed based on logic and automatically inserted into or onto one or more FPGAs or other logic devices, along with suitable run-time modes that can be supported by the run-time scheduler. Among other things, in some embodiments, the run-time scheduler for a logic device can consider thermal characteristics (such as temperatures) of the logic device, current and future processing/execution loads on components of the logic device, and various latencies associated with the components of the logic device when making scheduling decisions for applications or other logic to be executed by that logic device. If multiple logic devices are available, the run-time scheduler for a logic device may also consider information associated with other logic devices, which may allow the run-time scheduler to schedule execution of applications or other logic by other logic devices. To support the run-time scheduler, in some embodiments, a subset of user requirements can be inserted onto an FPGA or other logic device. The inserted data can include information related to latencies, powers, clock frequency selects, resources, priorities, FPGA or other logic boards, and FPGA or other logic chips (or any other suitable information). In some cases, at least some of the components of one or more FPGAs or other logic devices (such as processing engines or cores) can be reprogrammable, and the run-time scheduler can consider and trigger the loading of data or instructions in parallel with operating an existing application, such as during an application "switch."

Various benefits or advantages may be obtained using the run-time scheduler depending on the implementation. For example, the run-time scheduler can support extremely fast operation, such as five to thirty nanosecond application switching in each engine or core of an FPGA or other logic device (plus any time for data movement that cannot be done in parallel with an existing application). The run-time scheduler can also support rules or other logic based on behavioral requirements, meaning the run-time scheduler can be easily configured and reconfigured as needed to provide the desired run-time scheduling functionality. Further, inter-chip communication of metrics for available scheduling of each application can be used to allow for intelligent dynamic loading, scheduling, and thermal management. In some cases, a single application or other logic may pass through or execute on different engines or cores (possibly in different logic devices) to support functions such as dynamic load control and temperature management. In addition, improved cost, size, weight, and power (CSWAP) can be obtained by allowing the same FPGAs or other logic devices to perform different functions. Additional details of example embodiments of the run-time scheduler are provided below.

FIG. 1 illustrates an example system 100 containing logic devices 102a-102d having run-time schedulers according to this disclosure. As shown in FIG. 1, the system 100 includes four logic devices 102a-102d that are arranged in a ring configuration, meaning each logic device 102a-102d is coupled to two neighboring logic devices 102a-102d using a loop or circular set of connections. However, the number of logic devices and the arrangement of the logic devices are for illustration only. The system 100 may include any other suitable number of logic devices, possibly including a single logic device. Also, the system 100 may include any other suitable connections between logic devices (assuming multiple logic devices are present).

Each of the logic devices 102a-102d represents a programmable semiconductor chip or other integrated circuit that can be programmed to perform one or more desired functions. For example, each of the logic devices 102a-102d may represent a field programmable gate array (FPGA), an adaptive compute accelerator platform (ACAP), an application-specific integrated circuit (ASIC), a very-large-scale integration (VSLI) chip, a memory chip, a data converter, a central processing unit (CPU), an accelerator chip, or other semiconductor chip or other integrated circuit containing one or more programmable resources.

In this example, each of the logic devices 102a-102d includes a collection of logic device engines or cores 104, which represent processing circuitry or other components that can be programmed to perform one or more desired functions. For instance, the engines or cores 104 may represent programmable processing cores, programmable artificial intelligence (AI) engines, or other programmable processing circuitry. Each of the logic devices 102a-102d may include any suitable number of processing engines or cores 104. In some cases, for example, each logic device 102a-102d may include several hundred or more of the engines or cores 104. The number of engines or cores 104 may depend, among other things, on the intended application for the logic device 102a-102d, the physical size of the logic device 102a-102d, and the physical size of each engine or core 104.

An engine/core and fabric logic configurable interface 106 represents a physical interface to the various engines or cores 104 of the logic device 102a-102d. For example, the interface 106 may include a fabric or other configurable set of communication pathways that allow data, instructions, or other information to be provided from one or more sources to the engines or cores 104 and that allow data or other information to be received from the engines or cores 104 and provided to one or more destinations. The fabric or other reconfigurable communication pathways can also support communications between various ones of the engines or cores 104. The interface 106 includes any suitable structure configured to provide a physical interface with and communications to, from, and between processing engines or cores of a logic device.

Various data movement components 108 are provided in each logic device 102a-102d to support the movement of instructions and data within or through the logic device 102a-102d. This can include instruction and data transfers involving the engines or cores 104 via the interface 106. For example, the data movement components 108 may include at least one memory controller 110, which can support interactions and information exchanges involving at least one external memory 112. Each external memory 112 represents any suitable storage and retrieval device or devices, such as one or more Double Data Rate-4 (DDR4) memory devices, Low-Power Double Data Rate-4 (LPDDR4) memory devices, or other suitable memory devices. Each memory controller 110 may therefore represent a DDR memory controller, LPDDR4 memory controller, or other suitable memory controller configured to facilitate storage of information in and retrieval of information from the at least one external memory 112.

The data movement components 108 may optionally include one or more interfaces that facilitate communications over one or more external pathways. For instance, a peripheral component interconnect express (PCI-e) controller 114 may be used to support communications over a PCI-e bus 116, and an Ethernet controller 118 may be used to support communications over an Ethernet, gigabit Ethernet, ten gigabit Ethernet, or other Ethernet connection 120. Communications over one or more other suitable interfaces 122 may also be supported by the data movement components 108, and communications with other chips 124 (meaning other logic devices 102a-102d) may be supported. Some example inter-chip communications are described below.

The data movement components 108 may further include one or more buffers 126 (such as one or more fabric memories) that can be used to temporarily store information being transported within or through the logic device 102a-102d. Each buffer 126 may, for instance, represent a block random access memory (BRAM) or a unified random access memory (URAM). One or more remote direct memory access (RDMA) controllers 128 facilitate data transfers involving the logic device 102a-102d. For example, the one or more RDMA controllers 128 may facilitate data transfers to or from the logic device 102a-102d involving one or more of the memory/memories 112, bus 116, connection 120, or other interfaces 122. The one or more RDMA controllers 128 here can also be used to provide flow control for the data transfers. Note that the ability to support data transfers using the one or more RDMA controllers 128 allows the data transfers to occur without using much if any logic device processing resources. This may also allow large numbers of data transfers to occur in parallel, which helps to achieve high throughputs. In addition, one or more data transformations 130 may be applied to data being moved within or through the logic device 102a-102d. This may allow, for example, row or column transpose operations or other operations to occur on data being transported within or through the logic device 102a-102d.

It should be noted here that various buffers 126, RDMA controllers 128, and data transformations 130 may be used in various ways to support desired data flows involving the logic device 102a-102d. Thus, for example, a first data flow may involve a first RDMA controller 128, a second data flow may involve a second RDMA controller 128 and a first buffer 126, and a third data flow may involve a third RDMA controller 128, a second buffer 126, and a fourth RDMA controller 128. As a result, various combinations of buffers, RDMA controllers, data transformations, and other data movement components 108 may be used in the logic devices 102a-102d. In general, the data movement components 108 may be designed or configured to support various flows of data within or through each logic device 102a-102d as needed or desired.

Each logic device 102a-102d here optionally includes at least one embedded processing device 132, which can execute various instructions to provide desired functionality in the logic device 102a-102d. For instance, the embedded processing device 132 may generate data that is provided to the engines or cores 104 or process data that is received from the engines or cores 104. The embedded processing device 132 may also interact with other logic devices 102a-102d. The embedded processing device 132 represents any suitable processing device configured to execute instructions, such as an embedded real-time (RT) processor or an embedded ARM processor or other reduced instruction set computing (RISC) processor.

Each logic device 102a-102d here includes or supports a run-time scheduler 134, which handles the scheduling of application or other logic execution by the processing engines or cores 104 and possibly other components of the logic device 102a-102d. For example, as described in more detail below, the run-time scheduler 134 may use a combination of events, operating modes, thermal information, or other information (at least some of which is not or cannot be known at compile time) to intelligently decide how best to schedule various applications or other logic to be executed by the engines or cores 104. The run-time scheduler 134 can also consider latency information and power requirements of the engines or cores 104 when determining how to schedule execution of the applications or other logic. If execution cannot be performed in a desired manner (such as when an application or other logic cannot be executed within a desired time period), the run-time scheduler 134 of one logic device 102a-102d may communicate with other logic devices 102a-102d in order to determine if the application or other logic can be suitably executed by another logic device 102a-102d.

Overall, the run-time scheduler 134 here can support a number of operations associated with execution scheduling for one or more applications or other logic. For example, the run-time scheduler 134 can support run-time application switching, meaning the applications or other logic executed by the engines or cores 104 of each logic device 102a-102d can change over time during operation of the logic devices 102a-102d. As another example, the run-time scheduler 134 can move an application or other logic executed by a first logic device 102a-102d to a second logic device 102a-102d, such as due to the current or predicted future thermal or processing load associated with the first logic device 102a-102d. As yet another example, the run-time scheduler 134 can reload instructions and application data in one or more of the engines or cores 104 while an application or other logic is running, which may support features such as extremely fast application switching. As still another example, the run-time scheduler 134 can support partial reconfiguration of one or more resources that are common to more than one application or other logic, so the run-time scheduler 134 can configure the one or more resources in advance of scheduling run-time needs. The run-time scheduler 134 interfaces with the various data movers to provide concurrent control and data movement within and between the logic devices 102a-102d.

Note that as part of its scheduling functionality, the run-time scheduler 134 can perform or initiate automatic instruction and data movements to support the dynamic execution of the applications or other logic by the engines or cores 104. In this way, the instructions and data needed for dynamic execution of applications or other logic can be provided to the engines or cores 104, such as via the interface 106 and one or more of the data movement components 108. Moreover, the run-time scheduler 134 can support inter-chip instruction and data movements if needed. This means that the run-time scheduler 134 in one logic device 102a-102d can provide instructions and data needed for execution of an application or other logic to another logic device 102a-102d, thereby allowing the other logic device 102a-102d to execute the instructions and use the data. The decision to move execution of an application or other logic can be made at run-time.

This type of functionality may find use in a number of potential applications. For example, various high-speed real-time sensor systems and other systems may typically involve the use of specialized compute accelerators. As a particular example, various radar systems may use specialized hardware components to process return signals. The engines or cores 104 of one or more logic devices 102a-102d can be used to provide the functionality of these specialized compute accelerators. Moreover, the run-time scheduler 134 can schedule the execution of one or more applications or other logic to provide the desired functionality and move the application(s) or other logic among the engines or cores 104 of one or more logic devices 102a-102d as needed to achieve the desired processing. In some cases, this can reduce the number of logic devices and other hardware in a system. This is because one or more logic device engines or cores 104 and the logic devices 102a-102d themselves can be quickly programmed and reprogrammed as needed or desired during run-time, which helps to improve the CSWAP of the overall system.

As one specific example of how this functionality might be used in one or more applications, the run-time scheduler 134 of at least one logic device 102a-102d may be used to reprogram one or more engines or cores 104 to perform mutually-exclusive functions at different times. For instance, assume an automotive vehicle includes front- and rear-facing cameras that may be used at different times, meaning (only the front-facing camera or only the rear-facing camera might be used at any given time. A logic device may be used to interact with the cameras and process image data from the cameras, such as to store processed image data on a Flash memory. Here, the processing of the image data may vary depending on which camera is in use. Thus, the logic device may reprogram one or more engines or cores 104 to process data in the appropriate manner, depending on which camera is currently being used. As another example, assume a communication device or system may transmit or receive information at different times but not transmit and receive information at the same time. A logic device may be used to process data for transmission or process received information, and the logic device may reprogram one or more engines or cores 104 depending on the communication mode. Of course, these examples are for illustration only, and any other suitable types of applications may use the run-time scheduler 134 as needed or desired.

Each logic device 102a-102d may include a number of additional components or features as needed or desired. For example, one or more fans 136 may be used for the logic device 102a-102d to cool the engines or cores 104 or other components of the logic device 102a-102d. As another example, one or more voltage regulators 138 may be used to produce operating voltages for one or more components of the logic device 102a-102d. At least one clock 140 may represent an oscillator or other source of at least one clock signal, which can be used to control the frequency, power, and resulting latency of various operations of the logic device 102a-102d.

Although FIG. 1 illustrates one example of a system 100 containing logic devices 102a-102d having run-time schedulers 134, various changes may be made to FIG. 1. For example, various components in FIG. 1 may be combined, further subdivided, replicated, omitted, or rearranged and additional components may be added according to particular needs. Also, FIG. 1 illustrates one example type of system in which at least one logic device having at least one run-time scheduler may be used. However, this functionality may be used in any other suitable device or system.

Figure 2:
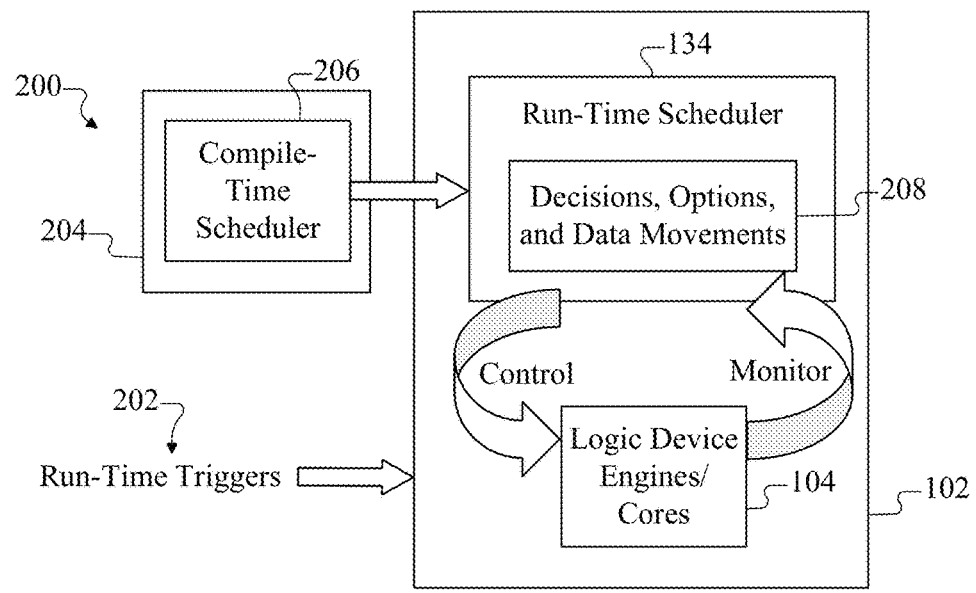
FIG. 2 illustrates an example technique for run-time scheduling with a logic device according to this disclosure.

FIG. 2 illustrates an example technique 200 for run-time scheduling with a logic device 102 according to this disclosure. The logic device 102 here may represent any of the logic devices 102a-102d shown in FIG. 1 above or other suitable logic device in any other suitable system. The logic device 102 may therefore include or be coupled to some, most, or all of the various components 104-140 shown in FIG. 1 and described above.

As shown in FIG. 2, the logic device 102 receives various run-time triggers 202, which may represent indicators of events, user commands, or other information that can trigger various actions by the logic device 102. In some cases, the run-time triggers 202 may indicate that an application switch is needed or desired at a specific time in the logic device 102, meaning one or more of the engines or cores 104 should switch from executing one application or other logic to executing another application or other logic. The run-time triggers 202 may have any suitable form here. In some cases, for instance, the run-time triggers 202 may explicitly identify the applications or other logic to be executed by the logic device 102. In other cases, the run-time triggers 202 may identify desired operating modes of the logic device 102, and the applications or other logic associated with each specific operating mode may be identified and executed.

In this example, a compiler 204 may be used to compile applications or other logic for execution by the logic device 102. Here, the compiler 204 includes a compile-time scheduler 206. Among other things, the compile-time scheduler 206 can make some decisions at compile-time in terms of how applications or other logic might be assigned to engines or cores 104 of one or more logic devices 102. The initial assignment of the logic may be based on known or estimated characteristics of the engines or cores 104 or the one or more logic devices 102. In some cases, the compile-time scheduler 206 may also generate multiple versions of each application or other logic that is compiled, such as one version that executes faster (but at a higher power requirement) and another version that executes slower (but at a lower power requirement).

Execution of the compiled applications or other logic by the logic device 102 is controlled by the run-time scheduler 134 of the logic device 102. The run-time scheduler 134 can perform various functions 208 to make decisions about which applications or other logic are to be executed and when. The run-time scheduler 134 can also consider various options in terms of assigning applications or other logic to the engines or cores 104, such as thermal characteristics of the logic device 102 or latencies of the logic device 102 or the engines or cores 104. The run-time scheduler 134 can further support data movements (and instruction movements if needed) in order to ensure that the engines or cores 104 have needed data and instructions at the desired times.

Here, the run-time scheduler 134 is shown as supporting both control and monitoring of the engines or cores 104.

Control of the engines or cores 104 can include controlling which applications or other logic is executed by which engines or cores 104 and at what times. Monitoring of the engines or cores 104 can include identifying thermal characteristics, soft or hard failures of hardware components or other fault information, real-time latency information, or other information associated with the engines or cores 104 during operation of the logic device 102. The information collected during monitoring may be used during control, such as when excessive thermal measurements or faults are used to reassign applications or other logic to engines or cores 104 (of the same logic device 102 or in a different logic device). This can be done without user input, meaning functions such as thermal management or fault recovery can occur automatically.

As described below, the run-time scheduler 134 can be configured to schedule the execution of applications or other logic based on a number of factors. For example, the run-time scheduler 134 can consider the number of logic devices 102 to be used, a number of applications or other logic to be executed by the logic device(s) 102, and thermal thresholds to be used with the engines or cores 104 of the logic device(s) 102 or with the logic device(s) 102. At least one of these parameters may be provided by a user. The run-time scheduler 134 can also consider a time required to pre-load data and instructions in order for the run-time scheduler 134 to set up for the next application or other logic to be executed (even while a current application or other logic is being executed). This may allow the run-time scheduler 134 to switch to the next scheduled application or other logic when commanded or as soon as possible at or near a desired start time. In some embodiments, the run-time scheduler 134 is configured to make scheduling decisions very rapidly, such as within five to thirty nanoseconds. The logic used by the run-time scheduler 134 to make the scheduling decisions can be pre-loaded so that quick math, conditional, or other operations can be used to select the best-fit combinations of applications or other logic and logic device resources.

In particular embodiments, the run-time scheduler 134 may consider the following types of information when making scheduling decisions. The run-time scheduler 134 can utilize a required time of execution for each application or other logic's "kernel" solution by the engines or cores 104 when determining how to schedule the applications for execution within a desired time period, and metrics for actual latency can be stored and used when determining when each kernel should be executed. The run-time scheduler 134 can also consider the setup time for getting a new application or other logic ready for execution when making a scheduling decision related to application switching. In addition, the time needed to reload instructions, move data, or perform partial reconfiguration of logic device resources can be considered to allow decisions at run-time to satisfy any specified requirements. Factors such as thermal limits of the engines or cores 104 can be considered, and (if needed or desired) lower power resources, lower clock rates, or lower power versions of applications or other logic may be selected for execution, or execution of an application or other logic may be scheduled on another logic device 102. Note that having the ability to use multiple logic devices 102 may help to reduce or avoid issues with throughput limitations associated with use of a single logic device 102.

As a particular example of this functionality, in some embodiments, the run-time scheduler 134 may consider one, some, or all of thermal information, latency information, fault information, and start-time information when making scheduling decisions. The thermal information can include temperature measurements or other temperature information associated with the engines or cores 104 or the logic device 102 itself. The latency information can include a latency time of each application or other logic as captured at compile time, a latency time of each application or other logic required for run-time, and/or a latency time required for loading each application or other logic into memory of one or more engines or cores 104 or for moving data for that application or other logic to the one or more engines or cores 104. The latency information may also include any partial reconfiguration time needed for fabric logic or other logic device resources at run-time. Thus, the latency information here generally allows a comparison between an overall allowed latency to the sum of all latencies for instruction, configuration, and data movements needed for an application or other logic to start running.

In some embodiments, the functionality of the run-time scheduler 134 can be at least partially defined by an automation tool, which may use user constraints, logic device hardware information, and behavioral source code to be executed by at least one logic device 102 to generate the run-time scheduler 134. An example of this is provided below. Note, however, that the run-time scheduler 134 may be created in any other suitable manner, such as via manual programming.

In some cases, the same general logic used by the run-time scheduler 134 may be reused in multiple logic devices 102, although each instance of the run-time scheduler 134 may be customized based on factors such as the number of logic devices to be used in a given embodiment and the number of applications or other logic to be executed. Among other things, this functionality allows for improved adaptability, such as the ability of a radar system to be modified to handle emerging threats or unforeseen (at compile time) combinations of events or conditions. This functionality also allows for improved fault-tolerance and timing requirement satisfaction, since an application or other logic that can be executed by a needed time on another logic device but not at a current logic device may be shared with the other logic device for execution.

Although FIG. 2 illustrates one example of a technique 200 for run-time scheduling with a logic device 102, various changes may be made to FIG. 2. For example, the run-time scheduler 134 may be used to control operations of other components of the logic device 102 in addition to controlling the operations of the engines or cores 104. As a particular example, the run-time scheduler 134 may be used to control the operations of one or more data movement components 108 and to control the configuration of the interface 106.

Figure 3:
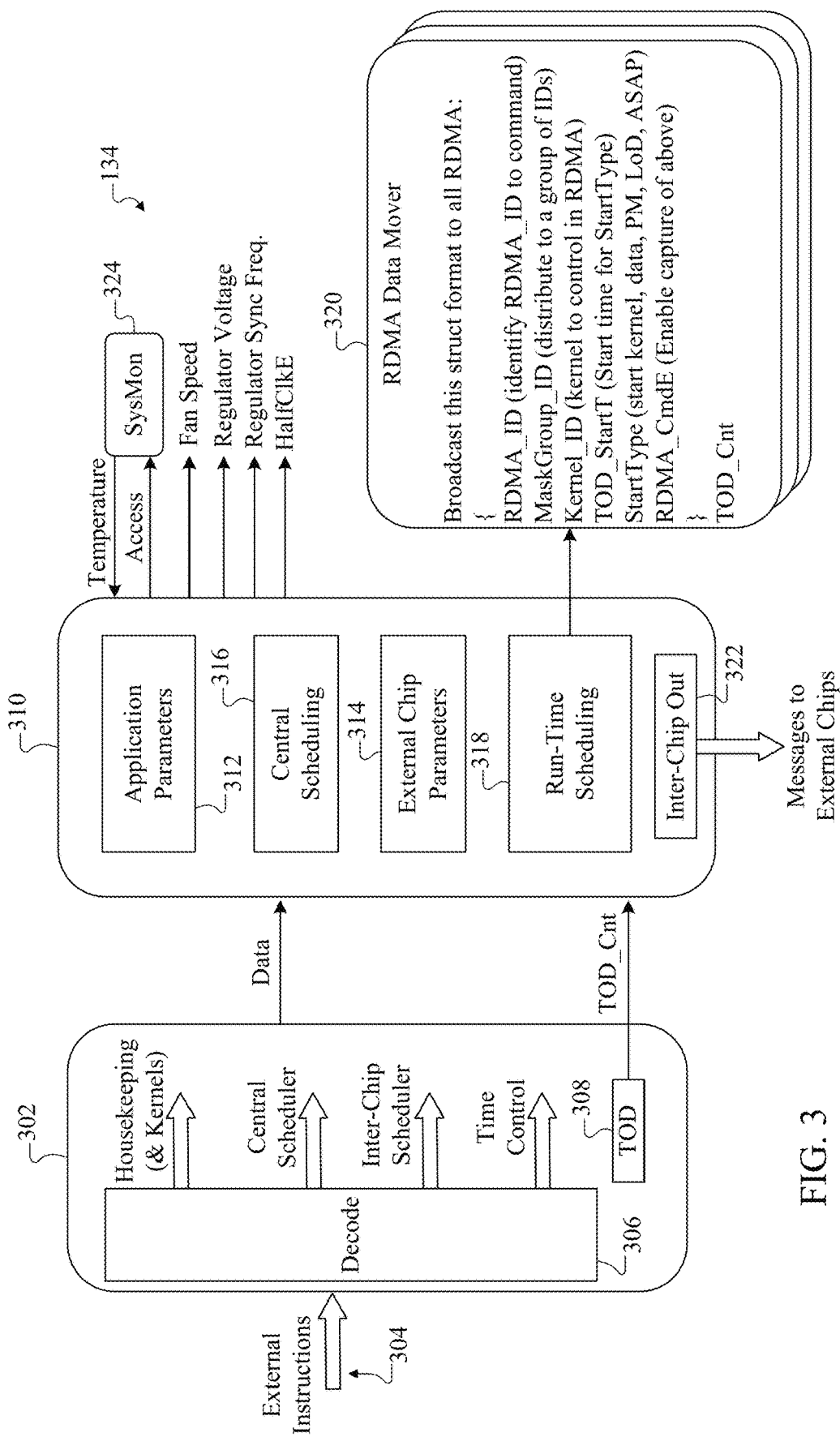
FIG. 3 illustrates an example run-time scheduler for a logic device according to this disclosure.

FIG. 3 illustrates an example run-time scheduler 134 for a logic device according to this disclosure. For ease of explanation, the run-time scheduler 134 is described as being used with the logic device 102 of FIG. 2, which may represent any of the logic devices 102a-102d in the system 100 of FIG. 1. However, the run-time scheduler 134 may be used with any other suitable logic device and in any other suitable system.

As shown in FIG. 3, the run-time scheduler 134 includes an input module 302, which generally receives commands, triggers, or other instructions 304 to be performed by the run-time scheduler 134. The input module 302 here includes a decoder 306, which can decode the instructions 304 and determine the types of operations to be performed by the run-time scheduler 134. In this example, the types of operations may include housekeeping operations (including operations related to application or other kernels), central scheduler operations (scheduling of operations for a logic device 102), inter-chip scheduler operations (scheduling of operations involving other logic devices 102), and time control operations. Note, however, that any other types of instructions 304 may be decoded and performed by the run-time scheduler 134. Also note that the kernel operations here may involve application or other logic kernels to be executed by the engines or cores 104 and any kernels related to other components of the logic device 102 (such as RDMA kernels). The input module 302 also includes a time of day (TOD) function 308, which can output an accurate time that is used for initiating execution of applications or for other purposes. The TOD function 308 can be set, reset, and synchronized across multiple logic devices 102.

The run-time scheduler 134 also includes an execution module 310, which performs various scheduling-related functions of the run-time scheduler 134. In this example, the execution module 310 includes or has access to application parameters 312 and external chip parameters 314. The application parameters 312 relate to characteristics of the applications or other logic to be executed by a logic device 102, and the external chip parameters 314 relate to characteristics of other logic devices 102 (if any). The parameters 312 and 314 may include both (i) parameters identified at compile-time and (ii) parameters identified during run-time.

In some cases, the application parameters 312 and the external chip parameters 314 may include one, some, or all of the following compile-time parameters: a list of application or other logic kernels that may be assigned to engines or cores 104 of a logic device 102, a listing of lower-level kernels that might make up each of at least one higher-level application or other logic, an ordering of kernels at higher levels that call kernels at lower levels, a clock rate to be used with each kernel, an identification of target chips that may operate each application (or kernel), temperature thresholds to be used when a lower clock rate, lower power kernel, changed fan speed, changed voltage regulator voltage, or changed sync frequency is used, each kernel's latency, an identification of whether a kernel is load on demand or run on demand, an identification of other logic devices 102 that can execute each kernel, an over-temperature threshold for a logic device 102, a kernel priority for each kernel, an instruction load time for each kernel, a data load time or partial reconfiguration time for each kernel, and an identification of any kernels that share resources. Here, "load on demand" may be used to indicate that a kernel is not loaded until instructed, and "run on demand" may be used to indicate that a kernel is not executed until instructed (but can be pre-loaded). Note, however, that these parameters are for illustration only and can vary as needed or desired.

Also, in some cases, the application parameters 312 and the external chip parameters 314 may include one, some, or all of the following run-time parameters: a time of day, a countdown to the start of a scheduled loading of instructions for each kernel, a current temperature of the logic device 102, current temperatures of other logic devices 102, a start time for execution of each kernel, an end time by which each kernel should complete execution, a scheduled start time for execution of each kernel at the logic device 102, a possible start time that another logic device 102 could start execution of each kernel, and an indication of whether a power saving mode is being used. Note, however, that these parameters are for illustration only and can vary as needed or desired.

This information (and possibly other information) can be used by a central scheduling function 316 and a run-time scheduling function 318. The central scheduling function 316 can be responsible for scheduling the overall applications or other logic to be executed by the logic device 102 and for providing a general schedule for execution. The run-time scheduling function 318 can be responsible for scheduling execution of specific kernels by specific hardware, such as when the run-time scheduling function 318 schedules execution of various application or other logic kernels by specific ones of the engines or cores 104.

As part of the run-time scheduling, the function 318 may broadcast or otherwise transmit one or more RDMA data mover definitions 320, which can be used to configure the RDMA controllers 128 for use during execution of the applications or other logic. In this example, each RDMA data mover definition 320 identifies a specific RDMA controller 128, a mask for a group of RDMA controllers 128, a kernel identifier for a kernel to be used with the RDMA controller 128, and a time of day at which the RDMA controller 128 will be used. Each RDMA data mover definition 320 also identifies whether the RDMA controller 128 will be used when starting execution of a kernel, to load data for a kernel, to program a memory (PM) for a kernel, to load a kernel on demand (LoD), or to execute a kernel as soon as possible (ASAP). In addition, each RDMA data mover definition 320 includes a flag to indicate whether the RDMA controller 128 should capture this information and a current time of day. This information allows an RDMA controller 128 to be configured for use with execution of a particular application or other logic and allows simultaneous start times throughout the logic device 102 (through local comparisons of commanded start times with the provided current time of day).

An inter-chip output 322 facilitates communication with other logic devices 102. For example, the inter-chip output 322 may allow RDMA data mover definitions 320 or other information to be sent to other logic devices 102. A system monitor 324 may also be used to provide information like temperature measurements of the logic device 102 to the execution module 310 for consideration by the run-time scheduling function 318. In addition, along with scheduling tasks, the execution module 310 can be used to adjust the speed of the fan 136, adjust the voltage or sync frequency of the voltage regulator 138, or adjust the frequency of the clock 140.

Among other things, the central scheduling function 316 or run-time scheduling function 318 can be used to predict power usage by a logic device 102 over time. This may allow the run-time addition of kernels to a schedule (such as during "slow" periodic intervals) and the modification of voltage control and clock frequency control features. The central scheduling function 316 or run-time scheduling function 318 can also be used for voltage control. This may allow changing of sync frequency rates and voltage levels depending on current and scheduled loads. The central scheduling function 316 or run-time scheduling function 318 can further be used for clock frequency control. This may allow changing of a clock frequency for lower power or fastest latency, such as when a clock buffer allows selecting a one-half clock frequency without losing the original clock signal. In addition, the central scheduling function 316 or run-time scheduling function 318 can be used for look-ahead scheduling, which may involve pre-scheduling one or more non-running kernels that can be accommodated in a schedule (so that the kernels can be executed immediately upon command). The look-ahead scheduling may be supported by a machine learning (ML) algorithm, which can be trained using prior decisions involving executed applications or other logic. Since application or other logic execution can vary quite a bit, the ML algorithm might be trained using a percentage of kernel completion as the basis for look-ahead scheduling.

In this way, the run-time scheduler 134 can support thermal mitigation, possibly based on temperature thresholds from a user constraint file. The run-time scheduler 134 can dynamically lower voltage levels or regulator switching frequencies, switch to half-clock frequencies driving logic device resources, control fan speeds, select lower power versions of kernels, or shut down a logic device 102 to prevent damage. The run-time scheduler 134 may also circumvent other logic devices 102 that are nearing their shutdown thresholds. In some cases, the run-time scheduler 134 may further support look-ahead run-time scheduling across multiple logic devices 102. For instance, the central scheduling function 316 for a particular application or other logic may identify a start time that allows setup of instructions and data in advance of executing the particular application or other logic. As each logic device's resource availability, thermal levels, or fault conditions change, chip-to-chip messages can be exchanged between the logic devices 102 so that each logic devices 102 has knowledge of the other logic devices' scheduling availability and predicted execution performance. Given all data available at a specific clock cycle, a rapid scheduler decision can be made by the central scheduling function 316 or run-time scheduling function 318 as to which logic device 102 will execute the particular application or other logic. Registers or other data storage can be used to track the performance and scheduling characteristics of each application or other logic, which helps to facilitate concurrent scheduling of multiple applications. In addition, the scheduling to RDMA data mover functions can be performed in advance, such as with a start time value that needs to match the current time of day before the RDMA data mover starts to function.

Although FIG. 3 illustrates one example of a run-time scheduler 134 for a logic device 102, various changes may be made to FIG. 3. For example, various components in FIG. 3 may be combined, further subdivided, replicated, omitted, or rearranged and additional components may be added according to particular needs. Also, the functionality of the run-time scheduler 134 may be implemented in any other suitable manner.

Figure 4:
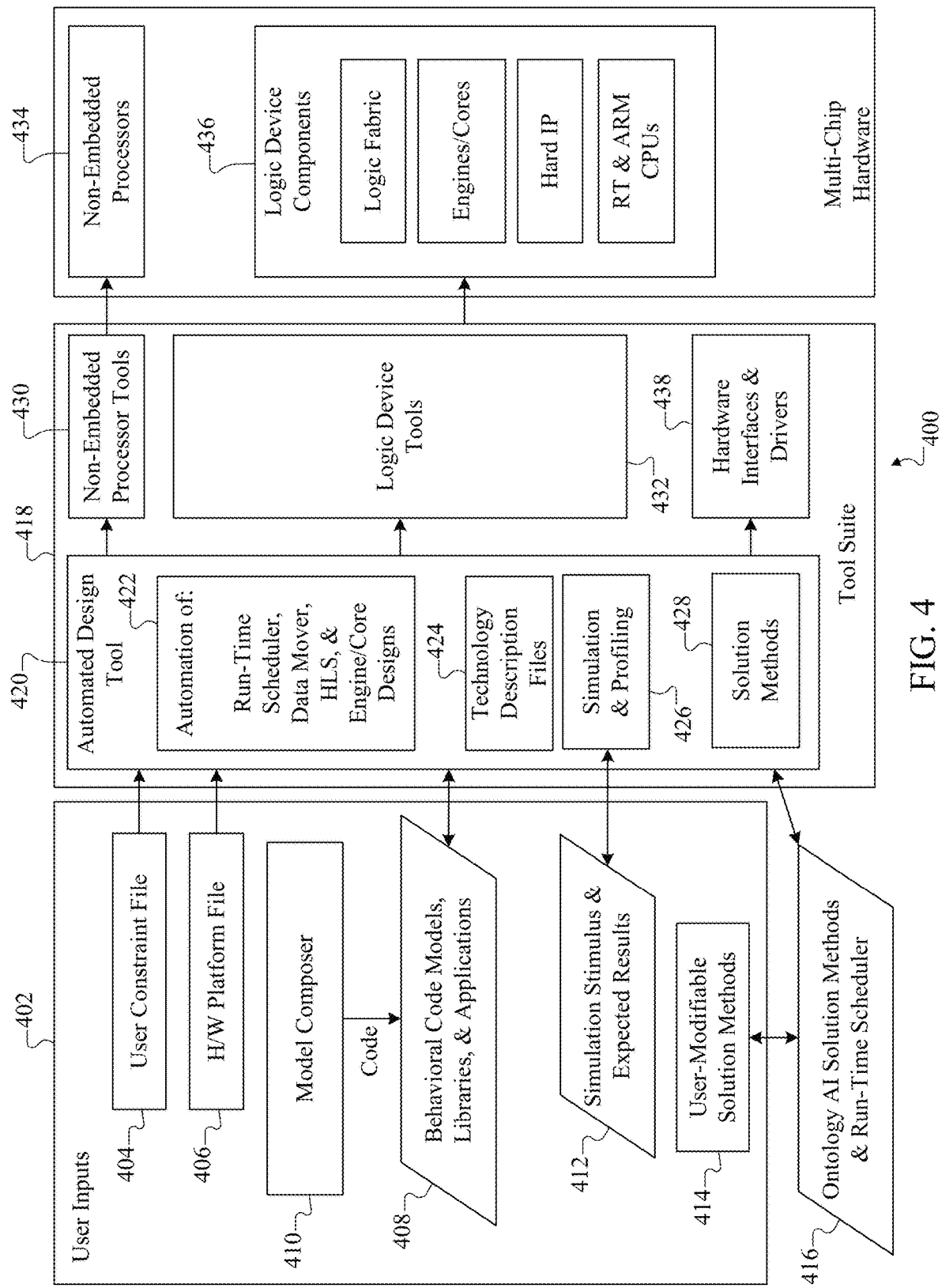
FIG. 4 illustrates an example architecture for designing a run-time scheduler for a logic device according to this disclosure.

FIG. 4 illustrates an example architecture 400 for designing a run-time scheduler for a logic device according to this disclosure. The architecture 400 may, for example, be used to generate a run-time scheduler 134 for use by one or more logic devices 102, 102a-102d. As shown in FIG. 4, the architecture 400 obtains a number of user inputs 402. In this example, the user inputs 402 include at least one user constraint file 404 and at least one hardware platform file 406. The user constraint file 404 can identify various user-defined constraints to be placed on a logic device 102 generally or a run-time scheduler 134 specifically, such as the maximum temperature threshold allowable for engines or cores 104 of a logic device 102 or for the logic device 102 itself. The hardware platform file 406 can identify various parameters of the logic device 102 or board characteristics to be used with the run-time scheduler 134, such as the number of engines or cores 104 and latencies associated with components and interfaces of the logic device 102.

The user inputs 402 may also include behavioral source models, libraries, and applications 408, which can define the actual logic to be executed by the engines or cores 104 of the logic device 102 during use. This can include, for example, the radar functionality to be executed in a radar application or other functionality to be executed in other applications. In some cases, at least some of the behavioral source models, libraries, and applications 408 may be manually created by a user. In other cases, a model composer 410 may receive inputs from a user defining a behavioral source code model to be implemented, and the model composer 410 may automatically generate at least part of the behavioral source models, libraries, and applications 408. The model composer 410 may, for instance, represent a MATLAB, SIMULINK, or XILINX tool for converting source code models into actual source code.

The user inputs 402 may further include simulation information 412 and user-modifiable solution method information 414. The simulation information 412 may include stimuli for simulations to be performed using a logic device design and expected results associated with the stimuli. The user-modifiable solution method information 414 represents an automation tool-provided list of methods that can be employed by the automation tool to solve a user's requirements for latency, resources, power, and timing closure. This may or may not include user inputs regarding the potential design for the run-time scheduler 134. An additional input here represents ontology-based information 416, which can include AI-based information regarding the potential design for the logic device 102 generally and/or for the run-time scheduler 134 specifically. The ontology-based information 416 may include or represent information associated with an ML/AI-based deep knowledge expert system, which can be used to capture and use information for mapping user applications to logic device designs while satisfying user constraints.

A tool suite 418 receives the various inputs and processes the information to automatically create a possible design for a logic device 102 (including a design for a run-time scheduler 134). The tool suite 418 can thereby help to reduce defects and improve design times for FPGAs or other types of logic devices 102. The tool suite 418 represents any suitable software automation tool for designing logic devices.

In this example, the tool suite 418 includes an automated design tool 420, which can be used to support various functions for automating the design of specific components of the logic device 102. This functionality includes a design function 422 for automating run-time scheduler, data mover, High-Level Synthesis (HLS), and engine/core designs of a logic device 102. This functionality also supports the use of one or more technology description files 424, which can describe the logic device 102 being designed (which has the benefit of minimizing modifications required for the automated design tool 420 for each new target technology). This functionality further includes a simulation and profiling function 426, which can simulate the operation of the designed logic device 102 and compare the simulated results with expected results or debug or profile the simulated results. In addition, this functionality supports the consideration of various solution methods 428, including those defined in the user-modifiable solution method information 414 and ontology-based solution methods identified by the automation tool. The automated design tool 420 represents any suitable software tool for designing various aspects of logic devices, such as the VISUAL SYSTEM INTEGRATOR (VSI) software tool from SYSTEM VIEW, INC. (as modified to support the design of the run-time scheduler 134 designed in accordance with this disclosure).

At least some of the outputs from the automated design tool 420 may be processed by one or more additional tools 430, 432. For example, the tool 430 may be used to convert any suitable aspects of the design of a logic device 102 (as determined by the automated design tool 420) into compiled code or other logic that may be executed by one or more non-embedded processors 434 associated with the hardware platform file 406. The tool 432 may be used to convert any suitable aspects of the design of the logic device 102 (as determined by the automated design tool 420) into compiled code, chip build (such as an FPGA configuration file), or other logic that may be executed by one or more components 436 of the logic device 102, such as code that can be used with a fabric (interface 106), engines/cores 104, hard intellectual property (IP) modules, or embedded processing devices 132 of the logic device 102. The tool(s) 430, 432 that are used here can vary depending on the logic device 102 ultimately being designed. For instance, the tools 432 may include FPGA company-specific tools, such as the XILINX VIVADO tool, the XILINX VITIS tool, or a XILINX AIE or network-on-a-chip (NoC) compiler. In addition, the outputs from the automated design tool 420 may include a definition of one or more hardware interface and one or more drivers 438 that can be used to interact with the logic device 102 as designed.

Although FIG. 4 illustrates one example of an architecture 400 for designing a run-time scheduler 134 for a logic device 102, various changes may be made to FIG. 4. For example, various components in FIG. 4 may be combined, further subdivided, replicated, omitted, or rearranged and additional components may be added according to particular needs. Also, the actual technique for designing a run-time scheduler 134 for a logic device 102 can easily vary based on, among other things, the specific logic device 102 for which the run-time scheduler 134 is being designed.

In addition, a run-time scheduler 134 for a logic device 102 may be designed using any other suitable automation tool or manually as needed or desired. As a result, while the designing of a run-time scheduler 134 is described above as being part of a larger collection of tools or other applications/logic that support partial- or fully-automated designing of logic devices, the approaches for designing run-time schedulers 134 described in this patent document may be used individually or with any other suitable collection of tools or other applications/logic that support partial- or fully-automated designing of logic devices.

Figure 5:
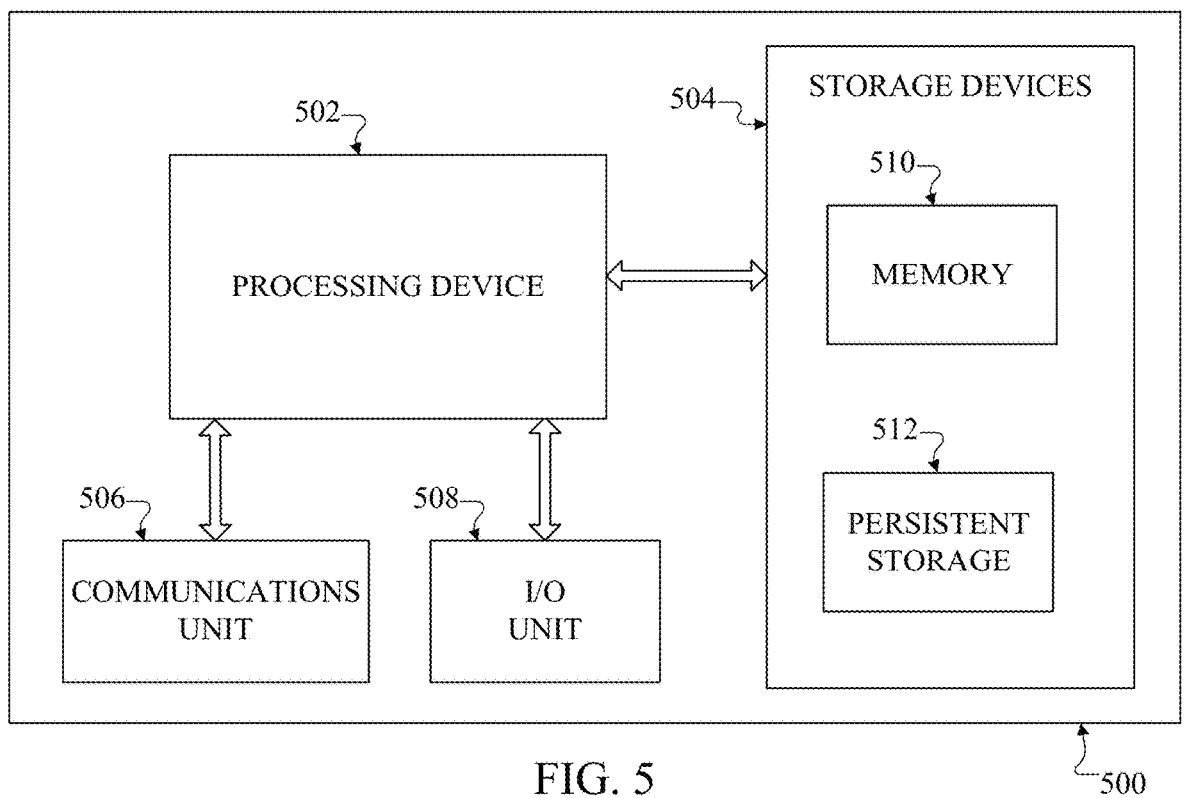
FIG. 5 illustrates an example computing device or system supporting design of a run-time scheduler for a logic device according to this disclosure.

FIG. 5 illustrates an example computing device or system 500 supporting design of a run-time scheduler 134 for a logic device according to this disclosure. The computing device or system 500 may, for example, be used to implement the architecture 400 shown in FIG. 4 and described above. Thus, the computing device or system 500 may be used to implement one or more functions of or related to the development or deployment of a run-time scheduler 134.

As shown in FIG. 5, the computing device or system 500 may include at least one processing device 502, at least one optional storage device 504, at least one communications unit 506, and at least one optional input/output (I/O) unit 508. The processing device 502 may execute instructions that can be loaded into a memory 510 or other location that is local to the processing device 502. The processing device 502 includes any suitable number(s) and type(s) of processors or other processing devices in any suitable arrangement. Example types of processing devices 502 include one or more microprocessors, microcontrollers, digital signal processors (DSPs), ASICs, FPGAs, or discrete circuitry.

The memory 510 and a persistent storage 512 are examples of storage devices 504, which represent any structure(s) capable of storing and facilitating retrieval of information (such as data, program code, and/or other suitable information on a temporary or permanent basis). The memory 510 may represent a random access memory or any other suitable volatile or non-volatile storage device(s). The persistent storage 512 may contain one or more components or devices supporting longer-term storage of data, such as a read only memory, hard drive, Flash memory, or optical disc.

The communications unit 506 supports communications with other systems or devices. The communications unit 506 may support communications through any suitable physical or wireless communication link(s), such as a network or dedicated connection(s).

The I/O unit 508 allows for input and output of data. For example, the I/O unit 508 may provide a connection for user input through a keyboard, mouse, keypad, touchscreen, or other suitable input device. The I/O unit 508 may also send output to a display or other suitable output device. Note, however, that the I/O unit 508 may be omitted if the device or system 500 does not require local I/O, such as when the device or system 500 represents a server or other component that can be accessed remotely over a network.

Although FIG. 5 illustrates one example of a computing device or system 500 supporting design of a run-time scheduler 134 for a logic device 102, various changes may be made to FIG. 5. For example, computing devices and systems come in a wide variety of configurations, and FIG. 5 does not limit the automated design of a run-time scheduler 134 to any particular computing device or system.

Figure 6:
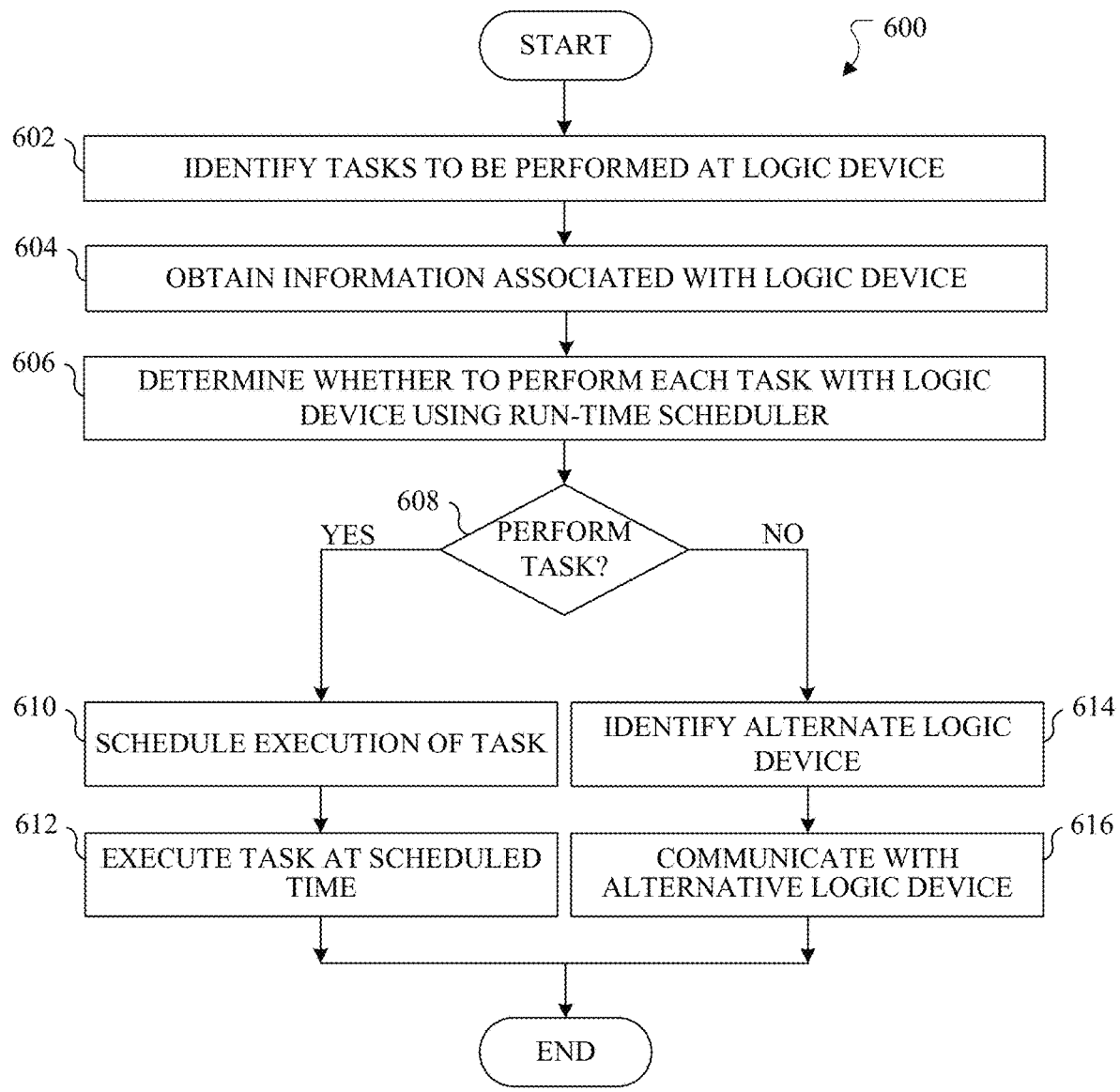
FIG. 6 illustrates an example method for run-time scheduling for a logic device according to this disclosure.

FIG. 6 illustrates an example method 600 for run-time scheduling for a logic device according to this disclosure. For ease of explanation, the method 600 is described as involving the use of the run-time scheduler 134 of FIG. 3 in the logic device 102 of FIG. 2 within the system 100 of FIG. 1. However, the method 600 may involve the use of any other suitable run-time scheduler and logic device in any other suitable system.

As shown in FIG. 6, tasks to be performed at a logic device are identified at step 602. This may include, for example, the central scheduling function 316 of the run-time scheduler 134 identifying that one or more specified applications or other logic is to be executed by the logic device 102. In some cases, this may be based on one or more instructions 304 received by the logic device 102. Information associated with the logic device is obtained at step 604. This may include, for example, the run-time scheduler 134 obtaining thermal information identifying one or more temperatures of the logic device 102 (such as from the system monitor 324). This may also include the run-time scheduler 134 obtaining latency information identifying one or more latency times related to the specified applications or other logic and to the logic device 102. This may further include the run-time scheduler 134 obtaining fault information identifying any faults or other problems related to the logic device 102. In addition, this may include the run-time scheduler 134 obtaining start-time information identifying a desired start time for each of the specified applications or other logic at the logic device 102.

Steps 606-616 shown in FIG. 6 may be performed for each task, such as when performed in parallel for each task. A determination is made whether to perform each task with the logic device at step 606. This may include, for example, the run-time scheduling function 318 of the run-time scheduler 134 determining whether the logic device 102 is experiencing any over-temperature conditions, faults, or other problems that might prevent execution of each specified application or other logic by the logic device 102. This may also include the run-time scheduling function 318 determining whether each specified application or other logic can be added to an execution schedule of the logic device 102 based on when each specified application or other logic needs to start or complete execution. The run-time scheduling function 318 may consider the latencies of the specified applications or other logic and of the logic device 102, and the run-time scheduling function 318 may consider whether multiple applications or other logic share one or more common resources (which might allow a subsequent application to complete more quickly using the common resources).

For each task determined to be performed by the logic device at step 608, the task is scheduled at step 610 and executed at the appropriate time at step 612. This may include, for example, the run-time scheduling function 318 identifying a time when a specified application or other logic should start execution. This may also include the run-time scheduling function 318 providing at least one RDMA data mover definition 320 or other configuration information to help ensure that instructions and data are loaded appropriately for use by one or more engines or cores 104 for execution of the specified application or other logic.

For each task determined not to be performed by the logic device at step 608, the logic device may identify an alternate logic device that might be able to execute the task at step 614, and communication with the alternate logic device to schedule execution of the task occurs at step 616. This may include, for example, the run-time scheduling function 318 of one logic device 102 identifying another logic device as having suitable availability to execute a specified application or other logic. This may also include the run-time scheduling function 318 communicating with the other logic device to schedule execution of the specified application or other logic by the other logic device.

Although FIG. 6 illustrates one example of a method 600 for run-time scheduling for a logic device 102, various changes may be made to FIG. 6. For example, while shown as a series of steps, various steps in FIG. 6 may overlap, occur in parallel, occur in a different order, or occur any number of times. Also, various steps shown in FIG. 6 may be omitted, such as when steps 614-616 are omitted if there is only one logic device being used.

Figure 7:
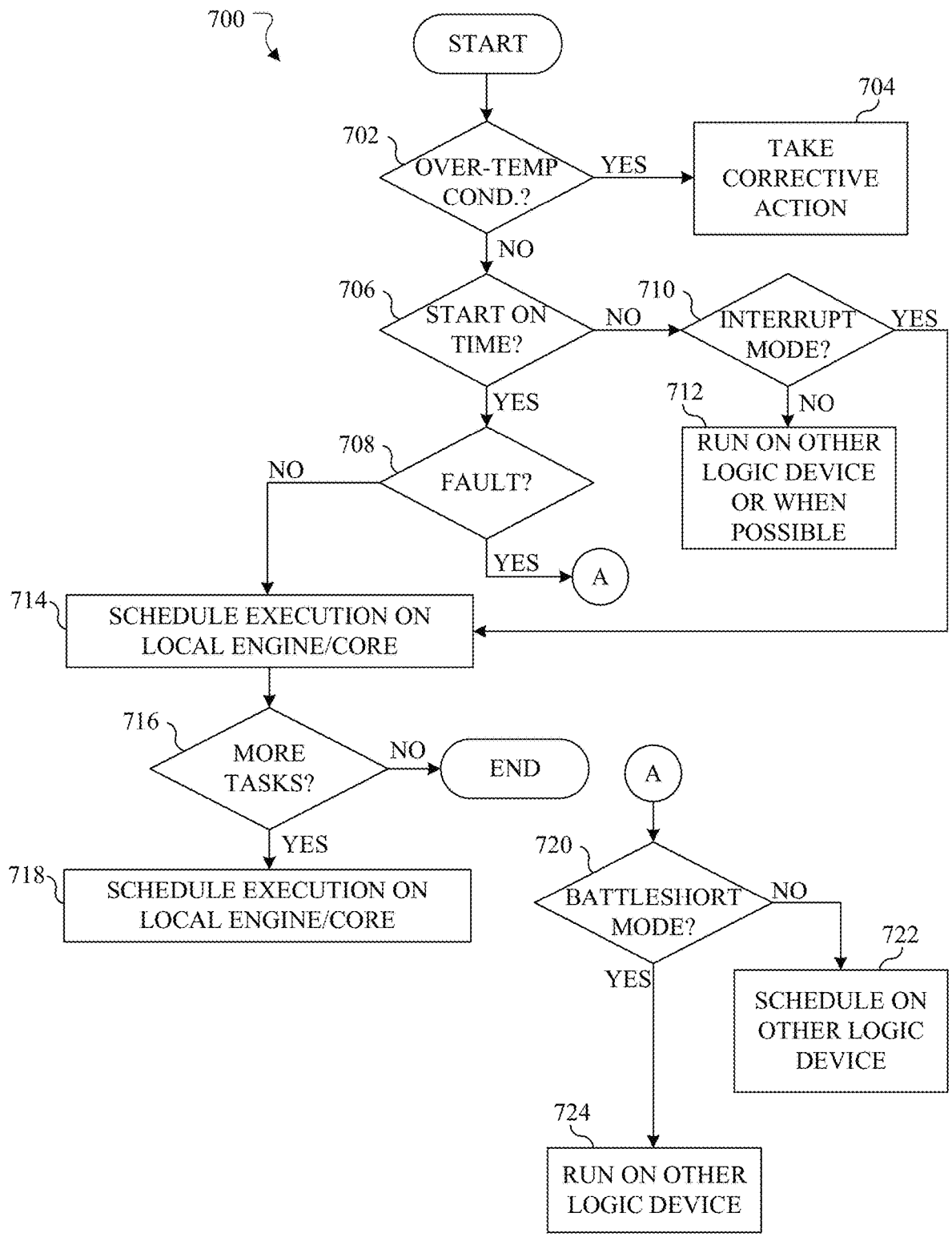
FIG. 7 illustrates an example method for making run-time scheduling decisions for a logic device according to this disclosure.

FIG. 7 illustrates an example method 700 for making run-time scheduling decisions for a logic device according to this disclosure. The method 700 may, for example, be performed during the method 600 as part of the process for determining whether to perform tasks at a logic device 102 and scheduling the tasks for execution by the logic device 102 (or another logic device). For ease of explanation, the method 700 is described as involving the use of the run-time scheduler 134 of FIG. 3 in the logic device 102 of FIG. 2 within the system 100 of FIG. 1. However, the method 700 may involve the use of any other suitable run-time scheduler and logic device in any other suitable system.

As shown in FIG. 7, a determination is made whether an over-temperature condition exists at a logic device at step 702. This may include, for example, the central scheduling function 316 of the run-time scheduler 134 determining whether temperature measurements for a logic device 102 exceed a user-defined or other threshold. If so, one or more corrective actions can occur at step 704. This may include, for example, the run-time scheduler 134 selecting one or more lower-power versions of one or more kernels for execution, reducing a clock frequency (such as by half), increasing a fan speed, or reducing a regulator voltage or regulator switching frequency. This may also include the run-time scheduler 134 selecting one or more kernels for execution by another logic device.

Steps 706-728 shown in FIG. 7 may be performed for each task, such as when performed in parallel for each task. A determination is made whether execution of each task can start by a desired start time at step 706. This may include, for example, the run-time scheduling function 318 of the run-time scheduler 134 using latencies and other information to determine whether execution of a specified application or other task can start by a specified start time. If so, a determination is made whether a fault or other problem with the logic device would prevent execution of the task at step 708. This may include, for example, the run-time scheduling function 318 using fault information to determine whether any engines or cores 104 are free from faults and are able to execute the specified application or other task. If so, execution of the task on at least one local engine or core of the logic device is scheduled at step 714.

If execution of the task cannot start when desired at step 706, a determination is made whether the logic device is in an interrupt mode of operation at step 710. This may include, for example, the run-time scheduling function 318 determining whether the logic device 102 would allow interruption of one executing task so that another task can be scheduled and executed. If so, the task can be scheduled on at least one local engine or core of the logic device at step 714. If needed, another task can be interrupted when the scheduled start time for the newly-scheduled task is reached. If not, the task can be scheduled on another logic device or scheduled for execution on the current logic device whenever possible at step 712.

Assuming a task is scheduled locally at step 714, a determination can be made whether there are related tasks (such as at least one other task forming part of the same application) at step 716. If so, the other task(s) can be scheduled for execution at step 718. If there is a fault that prevents the current logic device from executing a task at step 708, a determination can be made whether a "battle-short" mode of operation is enabled at step 720, which can operate normally despite faults such as over-temperature conditions. If not, the task can be scheduled for execution by another logic device at step 722. If so, the task can be executed by another logic device at step 724. In some applications (such as defense-related applications), it is possible for damage to occur to some logic devices while other logic devices remain operational, such as when a naval vessel or other platform that includes the logic devices is engaged in battle. Depending on the situation, the run-time scheduler 134 may simply attempt to schedule tasks on other logic devices or actually cause the tasks to be executed by the other logic devices. Note, however, that this mode of operation is not necessary for various embodiments of this disclosure.

Although FIG. 7 illustrates one example of a method 700 for making run-time scheduling decisions for a logic device 102, various changes may be made to FIG. 7. For example, while shown as a series of steps, various steps in FIG. 7 may overlap, occur in parallel, occur in a different order, or occur any number of times. Also, various steps shown in FIG. 7 may be omitted, such as when one of step 722 or 724 occurs after step 708 (and the determination in step 720 is omitted). In addition, the described functions that occur in response to the various determinations in steps 702, 706, 708, 710, 716, 720 can vary depending on the circumstances. For instance, a wide variety of actions may occur in response to an over-temperature condition, in response to not starting a task on time, or in response to a fault.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software or hardware components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining thermal information and latency information associated with multiple components of at least one semiconductor chip, the latency information identifying multiple latencies associated with multiple applications to be executed by the components of the at least one semiconductor chip, the multiple latencies comprising a latency time required for loading each of the applications into a memory of the at least one semiconductor chip; and
   scheduling, using a run-time scheduler on the at least one semiconductor chip, execution of the multiple applications by the components of the at least one semiconductor chip;
   wherein the run-time scheduler utilizes the thermal information and the latency information along with run-time events to determine which components of the at least one semiconductor chip execute the applications over time; and
   wherein, in response to detecting an over-temperature condition associated with a specified component of the at least one semiconductor chip or with the at least one semiconductor chip, the run-time scheduler is configured to increase a fan speed.

2. The method of claim 1, wherein:
   the run-time scheduler also utilizes start time information and fault information to determine which components of the at least one semiconductor chip execute the applications over time;
   the start time information identifies when execution of each of the applications should start; and
   the fault information identifies one or more faults associated with the at least one semiconductor chip.

3. The method of claim 1, further comprising:
   loading different instructions for different ones of the applications into one or more common components of the at least one semiconductor chip at different times to allow switching of the applications executed by the one or more common components of the at least one semiconductor chip.

4. The method of claim 1, further comprising:
   recovering from the over-temperature condition or a fault associated with the at least one semiconductor chip automatically by reassigning execution of at least one of the applications.

5. The method of claim 1, wherein, in response to detecting the over-temperature condition associated with the specified component of the at least one semiconductor chip or with the at least one semiconductor chip, the run-time scheduler is further configured to at least one of:
   switch to a local lower-power kernel executed by the specified component;
   utilize another component of the at least one semiconductor chip or another application utilizing common resources of the at least one semiconductor chip;
   at least one of reduce a voltage, reduce a clock frequency, and modify a switching regulator sync frequency of the at least one semiconductor chip; and
   schedule execution of at least one of the applications on a different semiconductor chip.

6. The method of claim 1, wherein, in response to determining that a specified one of the applications is unable to complete in a specified time using the specified component of the at least one semiconductor chip, the run-time scheduler is configured to at least one of:

use a faster application or kernel version on the specified component;
utilize another component of the at least one semiconductor chip to execute the specified application;
utilize a compile-time parameter specifying which applications share common resources and schedule time on at least one of the common resources;
interrupt a lower-priority component resource to execute a priority kernel in reduced time; and
schedule execution of the specified application on a different semiconductor chip.

7. The method of claim 1, wherein the at least one semiconductor chip comprises at least one of: a field programmable gate array (FPGA), an adaptive compute accelerator platform (ACAP), an application-specific integrated circuit (ASIC), a very-large-scale integration (VSLI) chip, a memory chip, a data converter, a central processing unit (CPU), and an accelerator chip.

8. An apparatus comprising:
at least one semiconductor chip; and
a run-time scheduler configured to:
obtain thermal information and latency information associated with multiple components of the at least one semiconductor chip, the latency information identifying multiple latencies associated with multiple applications to be executed by the components of the at least one semiconductor chip, the multiple latencies comprising a latency time required for loading each of the applications into a memory of the at least one semiconductor chip;
schedule execution of the multiple applications by the components of the at least one semiconductor chip, wherein the run-time scheduler is configured to utilize the thermal information and the latency information along with run-time events to determine which components of the at least one semiconductor chip execute the applications over time; and
in response to detecting an over-temperature condition associated with a specified component of the at least one semiconductor chip or with the at least one semiconductor chip, increase a fan speed.

9. The apparatus of claim 8, wherein:
the run-time scheduler is also configured to utilize start time information and fault information to determine which components of the at least one semiconductor chip execute the applications over time;
the start time information identifies when execution of each of the applications should start; and
the fault information identifies one or more faults associated with the at least one semiconductor chip.

10. The apparatus of claim 8, wherein the run-time scheduler is further configured to initiate loading of different instructions for different ones of the applications into one or more common components of the at least one semiconductor chip at different times to allow switching of the applications executed by the one or more common components of the at least one semiconductor chip.

11. The apparatus of claim 8, wherein the run-time scheduler is further configured to recover from the over-temperature condition or a fault associated with the at least one semiconductor chip automatically by reassigning execution of at least one of the applications.

12. The apparatus of claim 8, wherein, in response to detecting the over-temperature condition associated with the specified component of the at least one semiconductor chip or with the at least one semiconductor chip, the run-time scheduler is further configured to at least one of:

switch to a local lower-power kernel executed by the specified component;
utilize another component of the at least one semiconductor chip or another application utilizing common resources of the at least one semiconductor chip;
at least one of reduce a voltage, reduce a clock frequency, and modify a switching regulator sync frequency of the at least one semiconductor chip; and
schedule execution of at least one of the applications on a different semiconductor chip.

13. The apparatus of claim 8, wherein, in response to determining that a specified one of the applications is unable to complete in a specified time using the specified component of the at least one semiconductor chip, the run-time scheduler is configured to at least one of:
use a faster application or kernel version on the specified component;
utilize another component of the at least one semiconductor chip to execute the specified application;
utilize a compile-time parameter specifying which applications share common resources and schedule time on at least one of the common resources;
interrupt a lower-priority component resource to execute a priority kernel in reduced time; and
schedule execution of the specified application on a different semiconductor chip.

14. The apparatus of claim 8, wherein the at least one semiconductor chip comprises at least one of: a field programmable gate array (FPGA), an adaptive compute accelerator platform (ACAP), an application-specific integrated circuit (ASIC), a very-large-scale integration (VSLI) chip, a memory chip, a data converter, a central processing unit (CPU), and an accelerator chip.

15. A non-transitory computer readable medium containing instructions that when executed cause at least one run-time scheduler of at least one semiconductor chip to:
obtain thermal information and latency information associated with multiple components of the at least one semiconductor chip, the latency information identifying multiple latencies associated with multiple applications to be executed by the components of the at least one semiconductor chip, the multiple latencies comprising a latency time required for loading each of the applications into a memory of the at least one semiconductor chip;
schedule execution of the multiple applications by the components of the at least one semiconductor chip; and
in response to detecting an over-temperature condition associated with a specified component of the at least one semiconductor chip or with the at least one semiconductor chip, increase a fan speed;
wherein the instructions when executed cause the run-time scheduler to utilize the thermal information and the latency information along with run-time events to determine which components of the at least one semiconductor chip execute the applications over time.

16. The non-transitory computer readable medium of claim 15, wherein:
the instructions when executed cause the run-time scheduler to also utilize start time information and fault information to determine which components of the at least one semiconductor chip execute the applications over time;
the start time information identifies when execution of each of the applications should start; and
the fault information identifies one or more faults associated with the at least one semiconductor chip.

17. The non-transitory computer readable medium of claim 15, wherein the instructions when executed further cause the run-time scheduler to initiate loading of different instructions for different ones of the applications into one or more common components of the at least one semiconductor chip at different times to allow switching of the applications executed by the one or more common components of the at least one semiconductor chip.

18. The non-transitory computer readable medium of claim 15, wherein the instructions when executed further cause the run-time scheduler to recover from the over-temperature condition or a fault associated with the at least one semiconductor chip automatically by reassigning execution of at least one of the applications.

19. The non-transitory computer readable medium of claim 15, wherein the instructions when executed further cause the run-time scheduler, in response to detecting the over-temperature condition associated with the specified component of the at least one semiconductor chip or with the at least one semiconductor chip, to at least one of:
   switch to a local lower-power kernel executed by the specified component;
   utilize another component of the at least one semiconductor chip or another application utilizing common resources of the at least one semiconductor chip;
   at least one of reduce a voltage, reduce a clock frequency, and modify a switching regulator sync frequency of the at least one semiconductor chip; and
   schedule execution of at least one of the applications on a different semiconductor chip.

20. The non-transitory computer readable medium of claim 15, wherein the instructions when executed further cause the run-time scheduler, in response to determining that a specified one of the applications is unable to complete in a specified time using the specified component of the at least one semiconductor chip, to at least one of:
   use a faster application or kernel version on the specified component;
   utilize another component of the at least one semiconductor chip to execute the specified application;
   utilize a compile-time parameter specifying which applications share common resources and schedule time on at least one of the common resources;
   interrupt a lower-priority component resource to execute a priority kernel in reduced time; and
   schedule execution of the specified application on a different semiconductor chip.

* * * * *